United States Patent [19]

Takumi

[11] Patent Number: 5,409,111
[45] Date of Patent: Apr. 25, 1995

[54] SCREW HOLDER FOR CONTINUOUS SCREWDRIVER AND METHOD OF MANUFACTURING THE SAME

[75] Inventor: Akira Takumi, Tochigi, Japan

[73] Assignee: Muro Corporation, Tokyo, Japan

[21] Appl. No.: 316,362

[22] Filed: Oct. 3, 1994

Related U.S. Application Data

[63] Continuation of Ser. No. 961,370, Oct. 15, 1992, abandoned.

[30] Foreign Application Priority Data

Oct. 15, 1991 [JP] Japan ................................. 3-295172

[51] Int. Cl.⁶ .............................................. B65D 85/24
[52] U.S. Cl. ..................................... 206/344; 206/443
[58] Field of Search ............... 206/338, 343, 344, 345, 206/346, 347, 820, 443

[56] References Cited

U.S. PATENT DOCUMENTS

| | | | |
|---|---|---|---|
| 2,982,595 | 5/1961 | Rogers, Jr. | 206/344 X |
| 3,967,727 | 7/1976 | Jakesch . | |
| 4,415,765 | 11/1983 | Iwasa et al. | 206/344 X |

FOREIGN PATENT DOCUMENTS

| | | |
|---|---|---|
| 49-111061 | 10/1974 | Japan . |
| 57-33973 | 2/1982 | Japan . |
| 59-124579 | 7/1984 | Japan . |
| 2058004 | 4/1981 | United Kingdom . |

*Primary Examiner*—Jacob K. Ackun
*Attorney, Agent, or Firm*—Oblon, Spivak, McClelland, Maier & Neustadt

[57] ABSTRACT

In a screw holder in which bands of synthetic resin are disposed on one side of a series of screws out of alignment with the line connecting the center of each screw to stabilize the feed of the screws by the feed pawl of a screwdriver, the screws are driven in the right position regardless of the presence of the bands. A series of screws having an enlarged head are held between a pair of bands of synthetic resin. While a substantially straight main band having a larger cross-sectional area than a secondary band maintains the strength of the screw holder, a secondary band is allowed to bend according to the profile of the screw held therebetween. The outer surface of the main band is flat, whereas an intermediate part between adjoining screws where the two bands meet is flattened without forming a rib-like projection therein. Each screw is caused to bite in the main band to reduce the thickness of its bitten part.

3 Claims, 4 Drawing Sheets

PRIOR ART FIG. 1
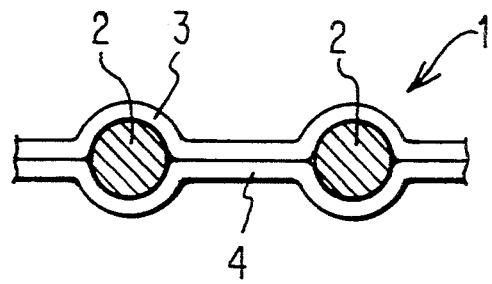
PRIOR ART FIG. 2
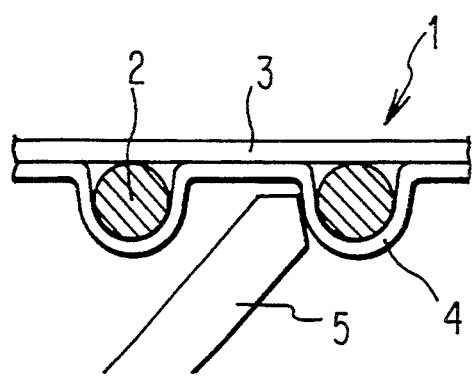
PRIOR ART FIG. 3
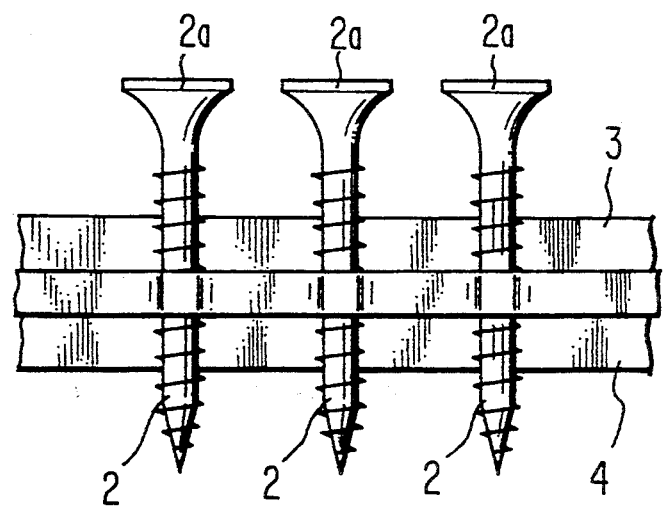

5,409,111

SCREW HOLDER FOR CONTINUOUS SCREWDRIVER AND METHOD OF MANUFACTURING THE SAME

This application is a continuation of application Ser. No. 07/961,370, filed on Oct. 15, 1992, now abandoned.

FIELD OF THE INVENTION

This invention relates to a screw holder for feeding a series of screws into a continuous screwdriver and a method of manufacturing the same.

DESCRIPTION OF THE PRIOR ART

The continuous screwdrivers disclosed in Japanese Provisional Patent Publications Nos. 33973 of 1982 and 124579 of 1984 are designed to receive a continuous supply of screws from a screw holder made of bands of synthetic resin holding a number of machine holders placed one after another.

Various types of such screw holders have been proposed and marketed but none has proved fully satisfactory. This type of screw holders must assure a stable feed of screws, one at a time, into the fastening position by means of the feed pawl on the driver. In addition, the band to hold the series of screws is required to keep the screw in the right position to permit proper driving by the bit of the screwdriver.

To be more specific, one each screw on the screw holder must be steadily fed into and held in the driving position where the bit drives the screw in place) by means of the reciprocating feed pawl on the screwdriver that comes into engagement therewith. For this reason, the holder is made of synthetic resin having high enough strength to keep the screws in a serial arrangement. In a screw holder 1, then, bands 3 and 4 of synthetic resin must be positioned out of alignment with a line that connects the center of each screw 2 as shown in FIGS. 2 and 3, rather than in alignment therewith as shown in FIG. 1.

With this off-centered arrangement, the feed pawl 5 pushes the band 4 on the center of the screw 2, which, in turn, stabilizes the engagement of the feed pawl 5 with the screw and the supply of the screw into the driving position. The feed pawl 5 is adapted to push the band 4, rather than the screw 2 itself, because the threaded surface of the screw is unsuited for pushing. This indirect pushing also prevents the wear of the feed pawl that might occur when it comes in direct contact with the hardened screw and permits feeding each screw in the right position.

Screw holders of this type have been already proposed in Japanese Provisional Patent Publication No. 111061 of 1974 and elsewhere.

However, a screw holder of the type shown in FIG. 2, in which bands 3 and 4 are not aligned with the line connecting the center of screws 2, faces a new problem in keeping each screw 2 in the right position when it is driven in a direction perpendicular to the bands 3 and 4 because the band 3 has a greater strength than the other band 4.

A screw holder 1 shown in FIGS. 2 and 3 comprises a series of screws 2 held between a pair of synthetic resin bands 3 and 4. One band 3 has a larger cross-sectional area than the other band 4 to impart a high enough strength to the band 3 itself to keep the screws 2 in a serial arrangement, with the screws 2 fastened in place by means of the band 4 having a smaller cross-sectional area and a greater deformability.

When each screw 2 is driven off this holder, as such, the enlarged head 2a thereof comes in contact with the band 3 when passing it. Then, the band 3, which has a high enough strength to keep the screw holder 1 in shape, exerts a reaction force to tilt the screw 2 out of the right position.

SUMMARY OF THE INVENTION

The object of this invention is to provide a screw holder comprising a series of screws and synthetic resin bands positioned on one side thereof out of alignment with the line connecting the center of each screw to steadily feed one screw after another into the driving position by means of the driving pawl on a continuous screwdriver which permits each screw to be driven in the right position irrespective of the presence of the bands and a method of manufacturing such screw holder with ease.

To achieve the above object, a screw holder according to this invention comprises a number of screws having an enlarged head that are arranged in a given direction and held between a pair of synthetic resin bands. One of the paired bands on one side of the series of screws has a larger cross-sectional area than the other. While the substantially straight main band having a larger cross-sectional area has a high enough strength to keep the screws in the serial arrangement, the flexible secondary band on the other side of the screws bands according to the profile of the screws on the main band. The series of screws is held in position between the two bands. The screw holder of this invention is characterized in that the main band has a substantially smooth outer surface, the two bands joined together between adjoining screws form a flat rib-free area, and each machine screw placed on the main band bits therein to reduce the thickness thereof.

A method of manufacturing a screw holder according to this invention comprises the steps of feeding a series of screws having an enlarged head and arranged in the same direction, extruding a pair of bands of semi-molten synthetic resin on both sides of the series of screws, and forming a screw holder by inserting the series of screws between the paired bands. A band of semi-molten synthetic resin on one side of the series of screws has a larger cross-sectional area than the other one. The series of screws are held between the two bands of semi-molten synthetic resin that are pressed together by means of pressing rollers. The roller to press the main band having a larger cross-sectional area has a cylindrical profile as a whole, whereas the other roller has a toothed gear-like profile to press the secondary band against the series of screws and the main band. While a pressing surface is provided at the tip of each teeth that is high enough to flatten the joined bands, a screw holding groove to accommodate a screw is provided between adjoining teeth. The two rollers make the outer surface of the main band substantially smooth, flatten the area between adjoining screws where the two bands meet without allowing the secondary band to form a rib-like projection, and force part of the screw into the main band to reduce the thickness of the corresponding part of the main band.

In the screw holder just described, the substantially straight larger main band on one side holds the series of screws. As this main band is disposed out of alignment with the line connecting the center of each screw, the driving pawl on the screwdriver pushes the center of each screw. Consequently, screws are steadily fed and held in the driving position, one after another. Also, the flattened part between adjoining screws where the two bands meet and the secondary band forms no rib-like projection assures the driving pawl to press the center of each screw.

Because the main band having a larger cross-sectional area is disposed on one side of the series of screws, the enlarged head of the screw driven by the bit of the screwdriver comes in contact therewith. Still, the screw remains in the right position because the part between adjoining screws is flattened, the secondary band forms no rib-like projection in that part, and the screws are forced into the main band to reduce the thickness thereof.

While a screw is held between the main and secondary bands prior to the start of driving by the bit of the screwdriver, the screw holder has high enough strength to maintain the straight forward travel of the screw as described later. Even after the breaking of the weak secondary band following the start of driving by the screwdriver bit, the screw remains in the right position as the main band retreats when the enlarged head of the screw comes in contact therewith because the main band is adapted to bend readily where both bands meet and more so where the thickness thereof is reduced by the biting screw.

The main band has a large enough cross-sectional area to obtain the strength to keep the screws in a serial arrangement. However, the cross-sectional area of the main band reduces in some parts where screws bite in. Still, the screws held in contact with the reduced parts by means of the secondary band make up for the resulting reduction in strength and maintain the screws steadily in the serial arrangement.

The manufacturing method according to this invention is designed to facilitate the making of the screw holder just described by the use of a pair of simple rollers that press the pair of bands on both sides of the series of screws.

The semi-molten synthetic resin to make the main and secondary bands can be fed to the pressing rollers from any desired point along the axis of the screw. By adjusting the feed point, the relative position of the main and secondary bands can be chosen freely within the limit in which they face each other. The relative position of the two bands may be adjusted by considering the position and function of the feed pawl of the screwdriver, the length of screws and other factors.

In the screw holder of this invention made by the method just described, the feed pawl steadily sends screws, one after another, into the driving position. Therefore, each screw is driven in the right position despite the presence of the holding bands of synthetic resin that are kept out of alignment with the line connecting the center of each screw. Besides, this invention provides an easy method to manufacture such screw holder.

BRIEF DESCRIPTION OF THE DRAWINGS

FIG. 1 is a cross-sectional view enlarging a part of a conventional screw holder.

FIG. 2 is a cross-sectional view enlarging a part of another conventional screw holder.

FIG. 3 is a front view of the same part.

DESCRIPTION OF THE PREFERRED EMBODIMENTS

Figure 4:
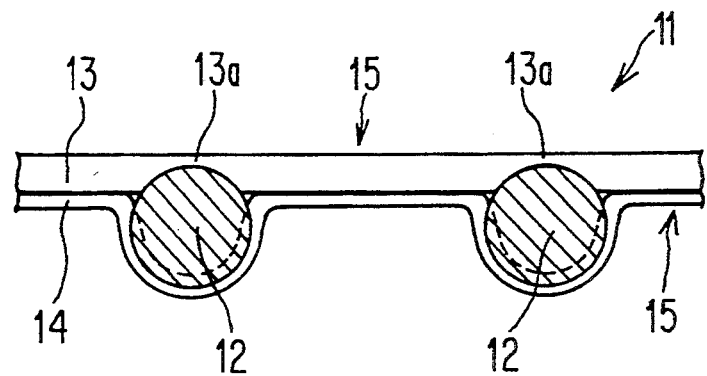
FIG. 4 is a cross-sectional view showing the principal part of a preferred embodiment of the screw holder according to this invention.
Figure 5:
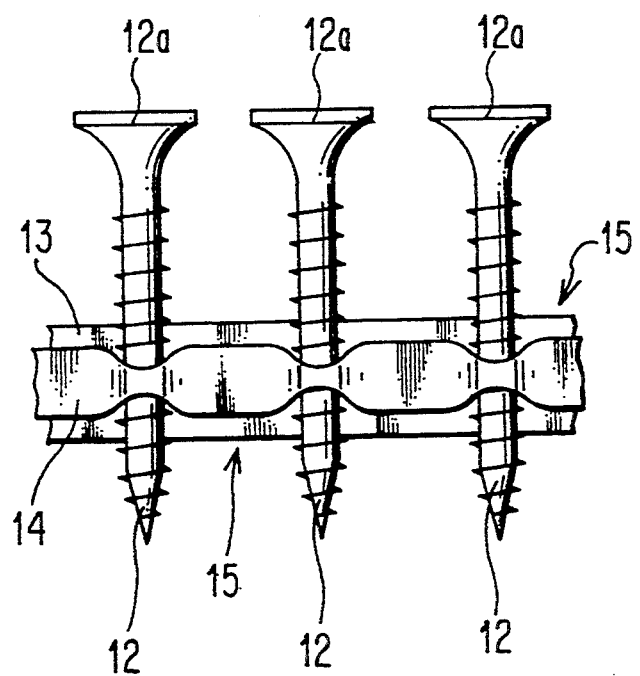
FIG. 5 is a front view of the principal part of the screw holder shown in FIG. 4.

FIGS. 4 and 5 show the construction of a screw holder 11 for the continuous screwdriver according to this invention.

The screw holder 11 comprises a series of screws 12 having an enlarged head 12a arranged in the same direction and held between a pair of synthetic resin bands 13 and 14. The main band 13 has a several times larger cross-sectional area than the secondary band 14. The main band 13, thus having a larger width and mean thickness than the secondary band 14, extends substantially straight on one side of the series of screws. By comparison, the secondary band 14 on the other side of the series of screws has a smaller cross-sectional area than the main band 13 and flexibly changes its form according to the profile of the screw on the main band 13. The bands 13 and 14 hold the series of screws therebetween.

As such, the main band 13 having a larger cross-sectional area maintains the strength and shape of the screw holder, thus stabilizing the position of the screw being driven by the screwdriver. On the other hand, the breakable secondary band 14 having a smaller cross-sectional area facilitates the parting of the screw 12 from the screw holder.

The substantially flat outer surface of the main band 13 serves as the guide plane when mounted in the screwdriver. An intermediate part 15 between adjoining screws 12 where both bands 13 and 14 meet is flattened to permit some bending under external force. This flattening does not reduce the thickness of the intermediate part 15. Instead, the secondary band 14 is kept from forming a rib-like projection which might prevent the bending of the intermediate part 15. Therefore, the thickness of the combined layer of the main and secondary bands 13 and 14 is reduced to a thickness substantially equal to the original thickness of the main band.

In forming the screw holder, each screw 12 is pressed into the main band 13 so that the whole thread crest and part of the thread root are buried therein, with the thickness of the main band 13 in that area reduced to form a thinner part 13a. On the other hand, a large portion of the secondary band 14 fits between the crests of the thread to fill the root opening therebetween.

In the screw holder 11, the substantially straight main band 13 having a larger cross-sectional area, which is positioned on one side of the series of screws out of alignment with the line connecting the center of each screw 12, maintains the strength and arrangement of the screw holder 11. This permits the feed pawl of the screwdriver to push the center of each screw 12 which is thereby steadily fed into the driving position.

When the screw 12 is driven by the screwdriver bit, the enlarged head 12a thereof comes in contact with the main band 13 having a larger cross-sectional area positioned on one side of the series of screws. While the intermediate part 15 between adjoining screws 12 where both bands meet is flattened without forming a rib-like projection, the screws 12 mounted on the main band 13 are pressed therein, with the corresponding part of the main band 13 reduced to form a thinner part 13a. After the secondary band 14 breaks following the start of screw driving, as such, the main band 13 retreats when the enlarged head 12a of the screw comes in contact therewith to keep the screw 12 in the proper position because the thinner part 13a of the main band 13 and the intermediate part 15 are flexible.

While the main band 13 has a large cross-sectional area to keep the strength of the screw holder, the cross-sectional area thereof is partly reduced in the thinner part 13a by the biting of the screw 12 mentioned before. In the screw holder, however, the screw 12 is in contact with the thinner part 13a and firmly held in position by the secondary band 14. This makes up for a decrease in strength due to the reduction of cross-sectional area, thereby keeping the main band 13 from bending in the thinner part 13a and maintaining the screw being driven in the stable right position.

Figure 6:
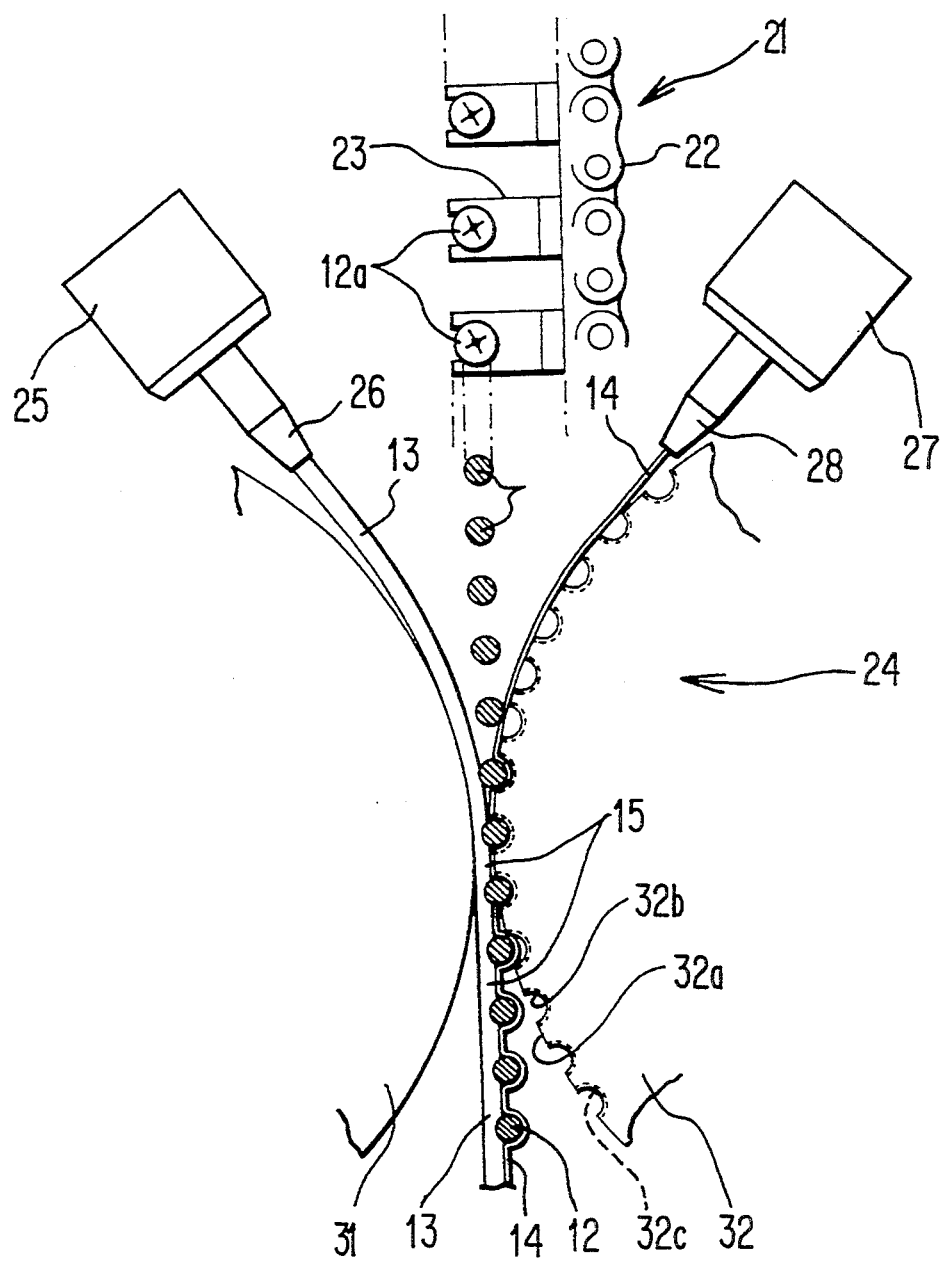
FIG. 6 is a partly cross-sectional plan view showing the principal part of a machine to manufacture a screw holder according to this invention.
Figure 7:
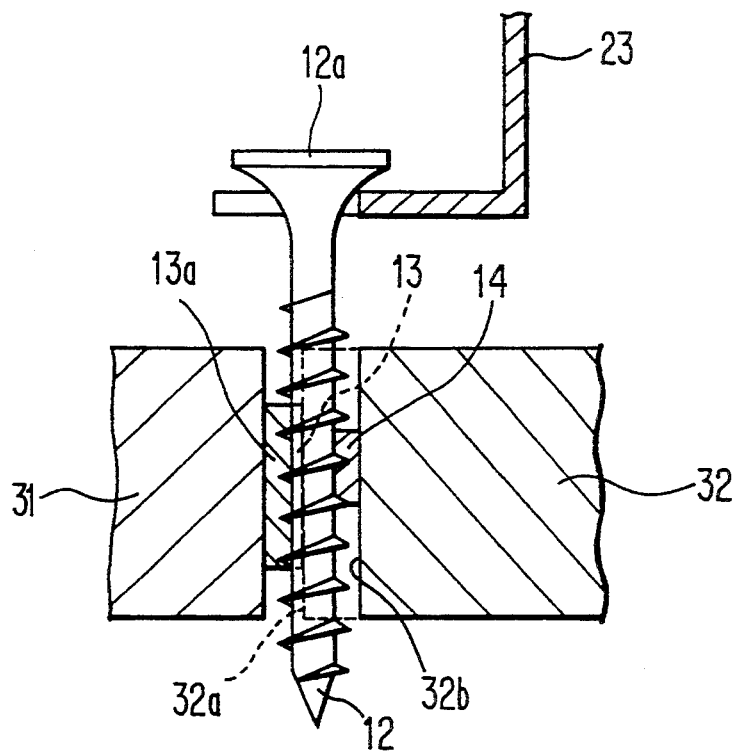
FIG. 7 is a cross-sectional view of the same principal part.

Referring now to FIGS. 6 and 7 showing the principal part of a screw holder manufacturing machine, the method of manufacturing the screw holder 11 will be described below.

Though not fully illustrated, this screw holder manufacturing machine comprises a screw feeder that feeds a series of screws arranged in the same direction, a screw conveying mechanism 21 that sends the series of screws forward at given intervals, a band joining mechanism 24 that feeds bands 13 and 14 of semi-molten synthetic resin to both sides of the series of screws being sent forward and joins the two bands together by pressing, and a take-up mechanism that coils a cut length of a screw holder thus completed.

The screw conveying mechanism 21 comprises, for example, a device that has a bracket 23 attached to a chain 22 and having a recess to engage with the enlarged head 12a of each screw 12, with the chain 22 conveying a series of screws 12 held at given intervals in a horizontal plane.

The band joining mechanism 24 has synthetic resin extruders 25 and 27 that feed the main and secondary bands 13 and 14 of semi-molten synthetic resin to both sides of the series of screws carried forward by the screw conveying mechanism 21. The extruders 25 and 27 force the bands 13 and 14 of semi-molten synthetic resin through the nozzle openings 26 and 28 therein. The two extruders may be replaced with a single extruder having two nozzles to feed the two bands of semi-molten synthetic resin as desired.

Furthermore, a pair of pressing rollers 31 and 32 are provided on both sides of the series of screws 12 to press the bands 13 and 14 of semi-molten synthetic resin against the series of screws.

The screw holder of this invention is manufactured as described below. While the screw conveying mechanism 21 carries forward a series of screws 12 spaced at given intervals, the extruder nozzles 26 and 28 of the band joining mechanism 24 force out the bands 13 and 14 to both sides of the series of screws 12 that are then held therebetween. The band of semi-molten synthetic resin supplied from the nozzle 26 of one extruder 25 has a larger cross-sectional area than the band supplied from the other extruder 27.

The series of screws is held between the two bands 13 and 14 that are joined together by means of the pressing rollers 31 and 32 on both sides thereof. While the pressing roller 31 to press the main band 13 having a larger cross-sectional area has a substantially cylindrical surface, the other pressing roller 32 to press the secondary band 14 has a toothed surface suited for pressing the secondary band 14 against the series of screws 12 and the main band 13.

Figure 8:
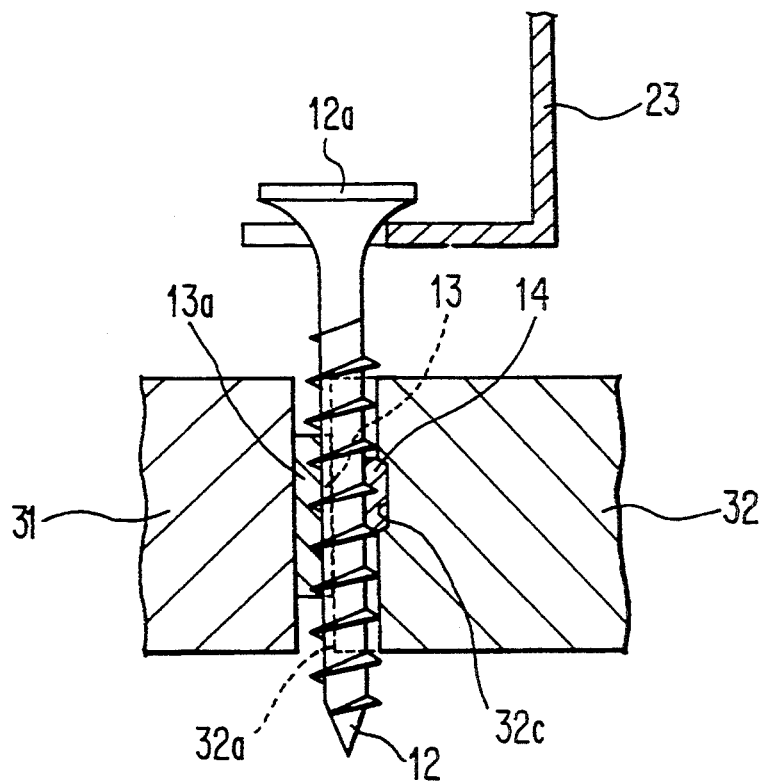
FIG. 8 is a cross-sectional view similar to FIG. 7 showing a modified example of pressing rollers.

While a pressing surface is provided at the tip 32a of each teeth on the pressing roller 32 for the secondary band 14 that is high enough to flatten the intermediate part 15 where the two bands meet, a screw holding groove 32b to accommodate a screw 12 and the secondary band 14 is provided between adjoining teeth. A small groove 32c opening in the circumferential direction of the pressing roller 32 may be provided, as shown in FIGS. 6 and 8, to stabilize the position of the secondary band 14 along the axis of the screw 12. However, the small groove 32c should be eliminated as shown in FIG. 7 when it is required to make the position of the secondary band 14 adjustable along the axis of the screw 12.

When the pressing rollers 31 and 32 press together the bands 13 and 14 on both sides of a series of screws, the main band 13 having a larger width and mean thickness than the secondary band 14 is disposed substantially straight on one side of the series of screws. By comparison, the other pressing roller 32 bends the secondary band 14 having an adequately smaller cross-sectional area than the main band 13 and disposed on the other side of the series of screws according to the profile of the screw on the main band 13.

The peripheral speed of the pressing rollers 31 and 32 is somewhat faster than the extruding speed of the synthetic resin from the nozzle of the extruders 25 and 27 to constantly apply a tensile force on the bands 13 and 14.

The nozzles 26 and 28 of the extruders should preferably be positioned as close as possible to the pressing rollers 31 and 32 to stabilize the extruding point of the synthetic resin thereon.

The pressing rollers 31 and 32 make the outer surface of the main band 13 substantially flat and form a flat intermediate part without a rib-like projection 15 between adjoining screws 12 where the two bands meet. Furthermore, each screw 12 is pressed against the main band 13 so that part of the screw 12 bites into the main band 13 to form a thinner part 13a thereon. Then, a screw holder 11 as shown in FIGS. 4 and 5 is completed.

The screw 12 may be kept in direct contact with the pressing roller 32 so that the pressing roller 32 presses the screw 12 directly against the main band 13. Otherwise, provision may also be made to press the screw 12 against the main band 13 through the secondary band 14 so that part of the screw 12 bites into the main band 13. The amount of the bite of the screw 12 into the main band 13 can be adjusted by controlling the temperature of the two bands 13 and 14.

The method of this invention facilitates the manufacturing of the screw holder 11 by the use of a pair of simple pressing rollers 31 and 32 that press together the bands 13 and 14 on both sides of the series of screws 12.

While the pressing roller 31 has a cylindrical surface, the other pressing roller 32 has an axially uniform profile when the small groove 32c is not provided. Therefore, the position of the nozzles 26 and 28 to feed semi-molten synthetic resin to form the main and secondary bands 13 and 14 is adjustable along the axis of the screw 12. This permits the adjustment of the feeding position of synthetic resin on the surface of the pressing rollers 31 and 32. The adjustment of the feeding position, in turn, permits the adjustment of the joining position of the main and secondary bands within the limit in which they face each other. Thus, the position of the main band can be adjusted as desired by considering the function of the screwdriver, the length of the screws, and other factors.

The specific examples described herein are given to illustrate preferred embodiments of the invention, and can be modified in various ways within the limits in which the spirit and scope of this invention are not departed.

What is claimed is:

1. A screw holder for continuous screwdrivers comprising:
   a series of screws having an enlarged head, said screws being linearly arranged;
   a pair of bands of synthetic resin between which the series of screws is held, the paired bands comprising a substantially straight main band disposed on one side of the series of screws and having large dimensional surfaces, when viewed in a direction perpendicular to both a length of said main band and longitudinal axes of said screws, with a cross sectional area sufficient for maintaining the strength of the screw holder as a whole, and a secondary band having large dimensional surfaces, when viewed in said direction, with a smaller cross-sectional area than that of the main band, disposed on the other side of the series of screws and able to bend according to the profile of the screw on the main band,
   wherein the main band has a substantially flat outer surface, and said secondary band, in an intermediate part between adjoining screws where the main and secondary bands meet, is flattened into said main band without allowing the secondary band to form a rib-like projection thereon, and wherein the screws on the main band bite therein to reduce the thickness of the bitten part thereof.

2. The screw holder according to claim 1, in which the intermediate part where the main and secondary bands meet is flattened to a thickness substantially equal to the original thickness of the main band.

3. The screw holder according to claim 1, in which each screw comprises a thread with crests, a large portion of the secondary band fits between the crests of a thread to fill a root opening therebetween.

* * * * *